United States Patent
Rhee et al.

(10) Patent No.: US 10,540,540 B2
(45) Date of Patent: Jan. 21, 2020

(54) METHOD AND DEVICE TO DETERMINE LANDMARK FROM REGION OF INTEREST OF IMAGE

(71) Applicant: Samsung Electronics Co., Ltd., Suwon-si, Gyeonggi-do (KR)

(72) Inventors: Seonmin Rhee, Seoul (KR); Jungbae Kim, Seoul (KR); Youngkyoo Hwang, Seoul (KR); Jaejoon Han, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 239 days.

(21) Appl. No.: 14/882,656

(22) Filed: Oct. 14, 2015

(65) Prior Publication Data
US 2016/0133002 A1    May 12, 2016

(30) Foreign Application Priority Data
Nov. 7, 2014   (KR) .......................... 10-2014-0154221

(51) Int. Cl.
*G06K 9/00*    (2006.01)
(52) U.S. Cl.
CPC .................... *G06K 9/00281* (2013.01)
(58) Field of Classification Search
None
See application file for complete search history.

(56) References Cited

U.S. PATENT DOCUMENTS

| | | | | |
|---|---|---|---|---|
| 5,581,629 A | * | 12/1996 | Hanna | H04N 5/272 348/E5.058 |
| 5,832,100 A | * | 11/1998 | Lawton | G06F 17/243 382/100 |
| 6,009,212 A | * | 12/1999 | Miller | G06K 9/32 382/131 |
| 6,301,370 B1 | | 10/2001 | Steffens et al. | |
| 8,457,367 B1 | | 6/2013 | Sipe et al. | |
| 8,494,231 B2 | | 7/2013 | Folta et al. | |
| 8,577,118 B2 | * | 11/2013 | Nepomniachtchi | G06K 9/3275 382/137 |
| 8,593,452 B2 | | 11/2013 | Solem et al. | |
| 9,014,432 B2 | * | 4/2015 | Fan | G06K 9/3258 382/105 |

(Continued)

FOREIGN PATENT DOCUMENTS

| KR | 20050022306 A | 3/2005 |
|---|---|---|
| KR | 100815291 B1 | 3/2008 |

(Continued)

OTHER PUBLICATIONS

Bruce D. Lucas et al. "An Iterative Image Registration Technique with an Application to Stereo Vision". Proceedings of Imaging Understanding Workshop.1981. pp. 121-130.

*Primary Examiner* — Nancy Bitar
(74) *Attorney, Agent, or Firm* — Harness, Dickey & Pierce, P.L.C.

(57) ABSTRACT

At least some example embodiments disclose a device and a method for determining a landmark of an image. The device may compare, to a key landmark set as a reference landmark, a first candidate landmark detected from a region of interest (ROI) of an input image and a second candidate landmark tracked from a previous frame, and determine a landmark similar to the key landmark to be a final landmark.

14 Claims, 12 Drawing Sheets

(56) References Cited

U.S. PATENT DOCUMENTS

| | | | |
|---|---|---|---|
| 9,158,744 B2* | 10/2015 | Rao | G06F 17/218 |
| 9,367,897 B1* | 6/2016 | Chen | G06K 9/48 |
| 2005/0107947 A1* | 5/2005 | Han | G05D 1/0246 |
| | | | 382/171 |
| 2010/0284590 A1* | 11/2010 | Peng | A61B 6/032 |
| | | | 382/128 |
| 2011/0091092 A1* | 4/2011 | Nepomniachtchi | G06K 9/3275 |
| | | | 382/139 |
| 2012/0004533 A1* | 1/2012 | Peng | A61B 6/12 |
| | | | 600/424 |
| 2012/0106806 A1* | 5/2012 | Folta | G06K 9/00295 |
| | | | 382/118 |
| 2013/0294652 A1* | 11/2013 | Fan | G06K 9/3258 |
| | | | 382/105 |
| 2014/0099001 A1* | 4/2014 | Nepomniachtchi | G06K 9/3275 |
| | | | 382/112 |
| 2014/0195891 A1* | 7/2014 | Venkata Radha Krishna Rao et al. | G06F 17/218 |
| | | | 715/234 |
| 2016/0133002 A1* | 5/2016 | Rhee | G06K 9/00281 |
| | | | 382/103 |
| 2016/0171656 A1* | 6/2016 | Chen | G06K 9/48 |
| | | | 382/300 |
| 2016/0275721 A1* | 9/2016 | Park | G06T 17/205 |
| 2018/0253839 A1* | 9/2018 | Zur | A61B 1/00009 |

FOREIGN PATENT DOCUMENTS

| | | |
|---|---|---|
| KR | 20080073933 A | 8/2008 |
| KR | 100886557 B1 | 3/2009 |
| KR | 100896643 B1 | 5/2009 |
| KR | 101089287 B1 | 12/2011 |
| KR | 20120095193 A | 8/2012 |
| KR | 101254181 B1 | 4/2013 |

* cited by examiner

METHOD AND DEVICE TO DETERMINE LANDMARK FROM REGION OF INTEREST OF IMAGE

CROSS-REFERENCE TO RELATED APPLICATION

This application claims the priority benefit of Korean Patent Application No. 10-2014-0154221, filed on Nov. 7, 2014, in the Korean Intellectual Property Office, the entire contents of which are incorporated herein by reference in its entirety.

BACKGROUND

1. Field

At least some example embodiments relate to a device and a method to determine a landmark of an image.

2. Description of the Related Art

A human face is an important element for visual distinction and identification in a field of image processing and interpretation. Since the 1990s, developments have been made on recognition of faces and analyses on facial expressions.

Recently, moving picture experts group 7 (MPEG-7) face descriptors have been proposed for face searches and identification in a flow of images. In comparison to a conventional facial recognition algorithm, such face descriptors may rapidly and effectively search for face images identical to a reference image.

Facial recognition technology may verify an identity of an individual of at least one individual appearing in a static image or a video using a provided face database.

Dissimilar to another biometric recognition technology, for example, fingerprint recognition, such a facial recognition technology may not require a user to place a portion of a body into direct contact with a recognition device. However, a recognition rate of the facial recognition technology may be lower than other biometric recognition technologies because a face may drastically change due to a change in illumination and a pose or a posture of a user, and highly sensitive to the surroundings.

SUMMARY

At least some example embodiments relate to a device for determining a landmark of an image.

In at least some example embodiments, the device may include a landmark detector configured to detect a first candidate landmark from a region of interest (ROI) of a current frame of an input image, a landmark tracker configured to track a second candidate landmark of the current frame from final landmark information of a previous frame of the input image, and a landmark corrector configured to determine final landmark information of the current frame based on the detected first candidate landmark and the tracked second candidate landmark.

The device may further include a key landmark determiner configured to determine a key landmark of the current frame based on the first candidate landmark and the second candidate landmark.

The key landmark determiner may determine one of the first candidate landmark and the second candidate landmark to be the key landmark, if a difference between a position of the first candidate landmark and a position of the second candidate landmark is less than a key threshold, and the landmark corrector may determine information associated with the key landmark to be the final landmark information of the current frame.

The landmark corrector may determine the final landmark information of the current frame based on a result of comparing at least one of the first candidate landmark and the second candidate landmark to a stored key landmark prior to the current frame.

The landmark corrector may determine the final landmark information of the current frame based on a level of similarity between the first candidate landmark and the stored key landmark and a level of similarity between the second candidate landmark and the stored key landmark.

The landmark corrector may determine the final landmark information of the current frame based on at least one of a first component including the first candidate landmark and a second component including the second candidate landmark.

The landmark corrector may determine the final landmark information of the current frame based on the first component, the second component and a corresponding reference component.

The device may further include an ROI of the current frame predictor configured to predict the ROI from the final landmark information of the previous frame.

The landmark tracker may verify whether the tracking of the second candidate landmark is successful. The landmark corrector may determine information associated with the first candidate landmark to be the final landmark information of the current frame if the tracking of the second candidate landmark if verified to be a failure.

The device may further include an ROI detector configured to detect the ROI of the current frame.

At least other example embodiments relate to a method of determining a landmark of an image.

In at least some example embodiments, the method may include detecting a first candidate landmark from an ROI of a current frame of an input image, tracking a second candidate landmark of the current frame from final landmark information of a previous frame of the input image, and determining final landmark information of the current frame based on the detected first candidate landmark and the tracked second candidate landmark.

The method may further include determining a key landmark of the current frame based on the first candidate landmark and the second candidate landmark.

The determining of the key landmark may include determining one of the first candidate landmark and the second candidate landmark to be the key landmark if a difference between a position of the first candidate landmark and a position of the second candidate landmark is less than a key threshold, and the determining of the final landmark information may include determining information associated with the key landmark to be the final landmark information of the current frame.

The determining of the final landmark information may include determining the final landmark information of the current frame based on a result of comparing at least one of the first candidate landmark and the second candidate landmark to a stored key landmark prior to the current frame.

The determining of the final landmark information may further include determining the final landmark information of the current frame based on a level of similarity between the first candidate landmark and the stored key landmark and a level of similarity between the second candidate landmark and the stored key landmark.

The determining of the final landmark information may include determining the final landmark information of the current frame based on at least one of a first component including the first candidate landmark and a second component including the second candidate landmark.

The determining of the final landmark information may further include determining the final landmark information of the current frame based in the first component, the second component and a corresponding reference component.

The detecting of the first candidate landmark may include predicting the ROI of the current frame from the final landmark information of the previous frame.

The tracking of the second candidate landmark may include verifying whether the tracking is successful. The determining of the final landmark information may include determining information associated with the first candidate landmark to be the final landmark information of the current frame if the tracking of the second candidate landmark is verified to be a failure.

The method may further include detecting the ROI of the current frame.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
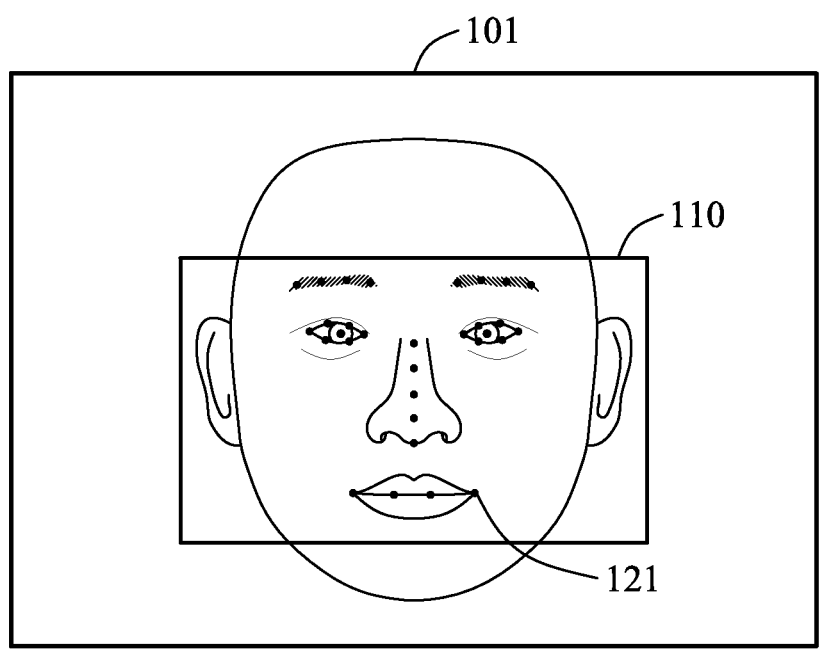
FIG. 1 illustrates a region of interest (ROI) and a landmark according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 illustrates an example of a region of interest (ROI) 110 and landmarks including the landmark 121 according to at least one example embodiment.

Referring to FIG. 1, the ROI 110 of an input image 101 includes a plurality of landmarks.

The input image 101 may refer to an image including at least one successive frame, and include a video. For example, the input image 101 may include an image in which an object, for example, a landscape, a human figure, an animal, and others, appears dynamically or statically.

The ROI 110 may refer to a region set in the input image 101 in which a user takes an interest. Although the ROI 110 is illustrated as a region including a human face, for example, a face region, in the example of FIG. 1, the ROI 110 may not be limited to such an example and thus, may be set as a region including another object in the input image 101.

Each landmark may indicate a feature point that represents a feature of the object in the ROI 110. For example, when the ROI 110 is the face region, the landmarks may indicate a feature point corresponding to a feature that represents the human face, for example, an eye, a nose, a lip, and an eyebrow. At least one landmark may be set for each feature of the object. Alternatively, a plurality of landmarks may be set for a single feature of the object. In the example of FIG. 1, a number of landmarks corresponding to a left eyebrow is four. However, the number of the landmarks may not be limited thereto, and the number of features set for the object in the ROI 110 and the number of landmarks corresponding to each feature may be determined. In addition, a component may indicate a set of the landmarks corresponding to each feature.

There may be a variety of applications that locate a feature point in the ROI 110, for example, the face region, from the input image 101 and use the feature point. For example, such applications may include an application for generating a three-dimensional (3D) individual face, an application for recognizing a face, an application for face cloning, a movie, and a game.

Here, performances of the applications, for example, the recognizing of a face and the face cloning, may be directly affected by accuracy in detecting and tracking the landmark 121 of the face region.

For example, the detection of the landmark 121 may be performed through training on pre-obtained face data and a statistical model, for example, an active appearance model (AAM) and a supervised descent method (SDM). However, the accuracy may not be ensured when the input image 101 greatly differs from an image used for the training due to sensitivity to an initial value. In addition, when the face is not detected, the landmark 121 may not be detected.

For example, when a successive image is input, the tracking of the landmark 121 may be performed by predicting a position of the landmark 121 in a current frame using information on an adjacent pixel of the landmark 121 in a previous frame. However, when the landmark 121 tracked from the previous frame is incorrect, an error may be accumulated and accordingly, the accuracy may gradually decrease.

According to an example embodiment, a device for determining a landmark of an image (e.g., a landmark determining device 1200), hereinafter also referred to as a landmark determining device, may determine the landmark 121 through the training and the statistical model at a high accuracy despite a case in which the accuracy decreases, for example, when the input image 101 greatly differs from learning data and a pose is changed.

For example, the landmark determining device may combine a landmark detecting method, for example, a holistic landmark detection method using training and statistical information, and a landmark tracking method based on intensity information of a local patch to determine the landmark 121, which is highly reliable. The landmark determining device may determine a key landmark through the detecting and the tracking of the landmark 121, and determine the landmark 121, which is correct, by feeding the key landmark back through a closed loop.

A detailed operation of the landmark determining device using the key landmark will be described hereinafter.

Figure 2:
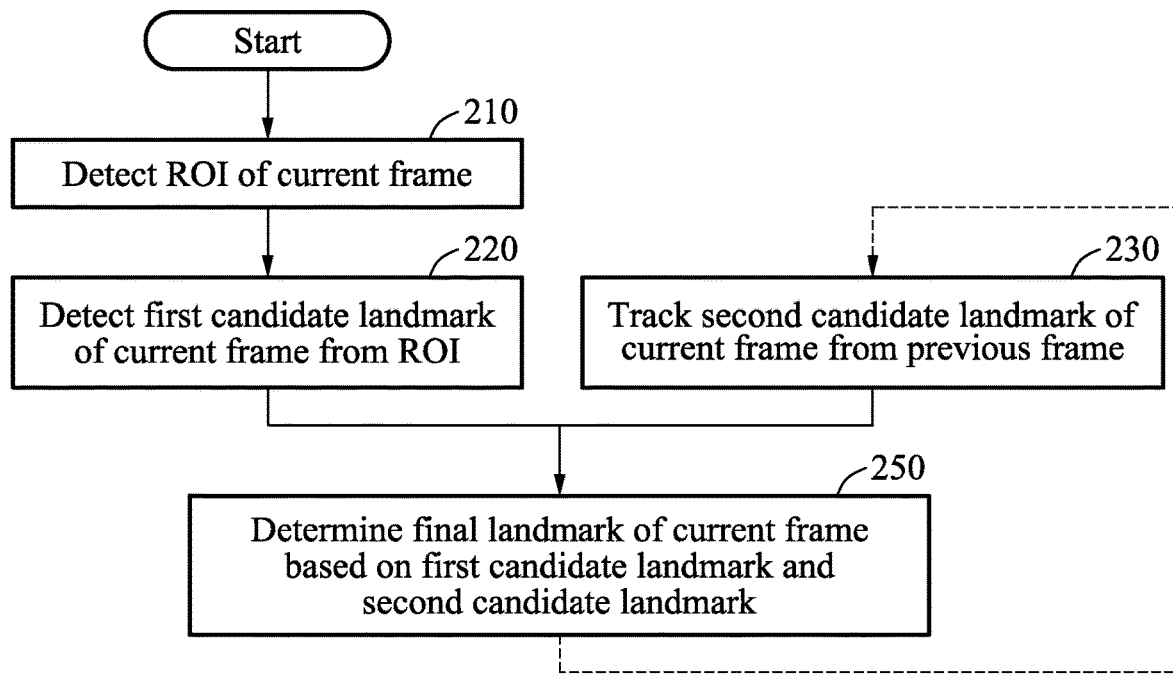
FIGS. 2 and 3 are flowcharts illustrating a method of determining a landmark of an image according to at least one example embodiment.
Figure 3:
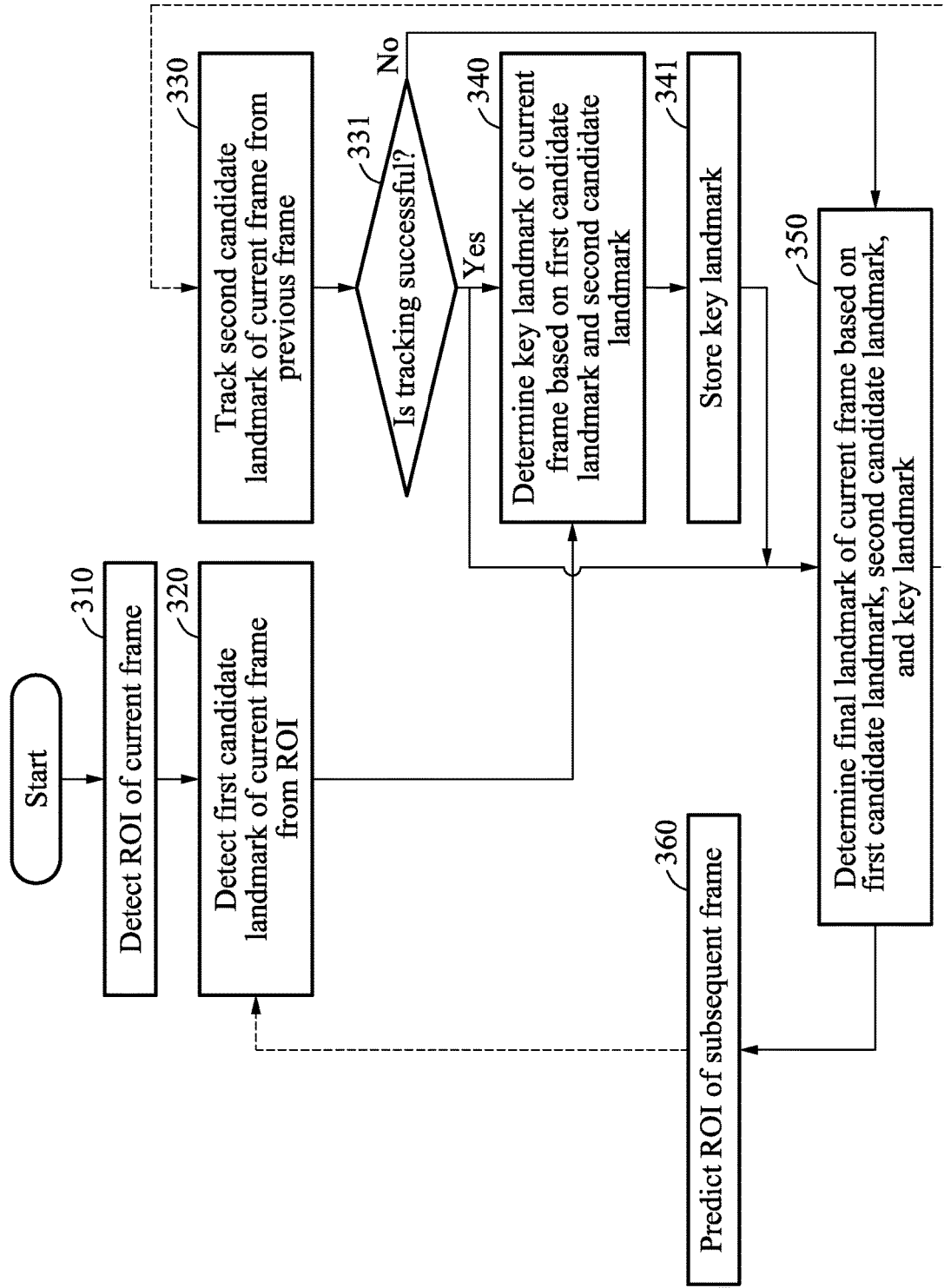

FIGS. 2 and 3 are flowcharts illustrating an example of a method of determining a landmark of an image according to at least one example embodiment.

In the examples of FIGS. 2 and 3, an operation to be performed in a current frame is illustrated in a solid line, and an operation to be performed in a subsequent frame is illustrated in a broken line.

FIG. 2 is a flowchart illustrating an example of a general method of determining a landmark of an image.

In the example of FIG. 2, an operation to be performed in a current frame is depicted by a solid line, and an operation to be performed in a subsequent frame is depicted by a broken line.

Referring to FIG. 2, in operation 210, an ROI detector detects an ROI of the current frame. For example, when the ROI is a face region, the ROI detector may detect, as the face region, a rectangular region including at least a portion of a face using a Viola-Jones face detector.

In operation 220, a landmark detector detects a first candidate landmark of the current frame from the ROI. The landmark detector may detect the first candidate landmark from the ROI using a pre-established statistical model and learning data. For example, when the ROI is a face region, the landmark detector may detect the first candidate landmark using an AAM, an active shape model (ASM), and an SDM.

In operation 230, a landmark tracker tracks a second candidate landmark of the current frame from a previous frame. For example, the landmark tracker may track the second candidate landmark of the current frame from final landmark information of the previous frame. The final landmark information of the previous frame may be determined in operation 250 performed on the previous frame.

For example, the landmark tracker may track the second candidate landmark from the final landmark information of the previous frame using a Lucas-Kanade optical flow method that compares sets of neighboring pixel brightness information and a method of calculating a level of similarity between a local patch of a landmark of the previous frame and a local patch of a tracked landmark.

Figure 9:
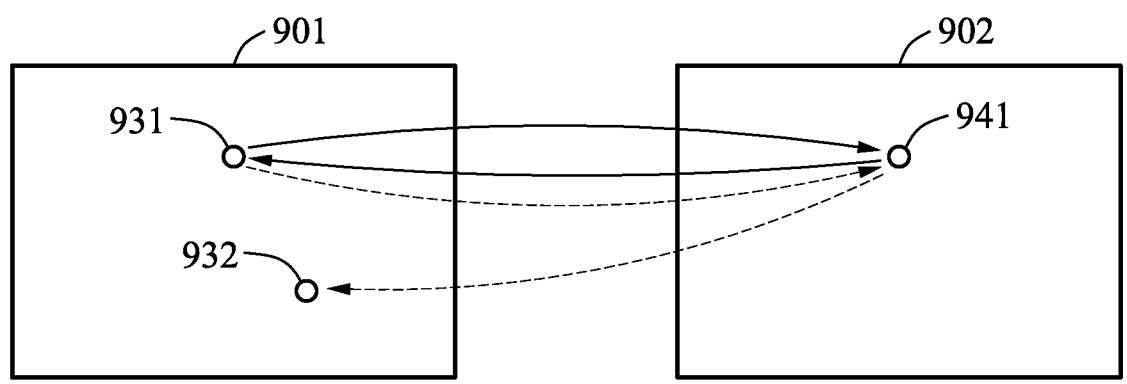
FIG. 9 illustrates an operation of verifying whether tracking a second candidate landmark is successful according to at least one example embodiment.
Figure 10:
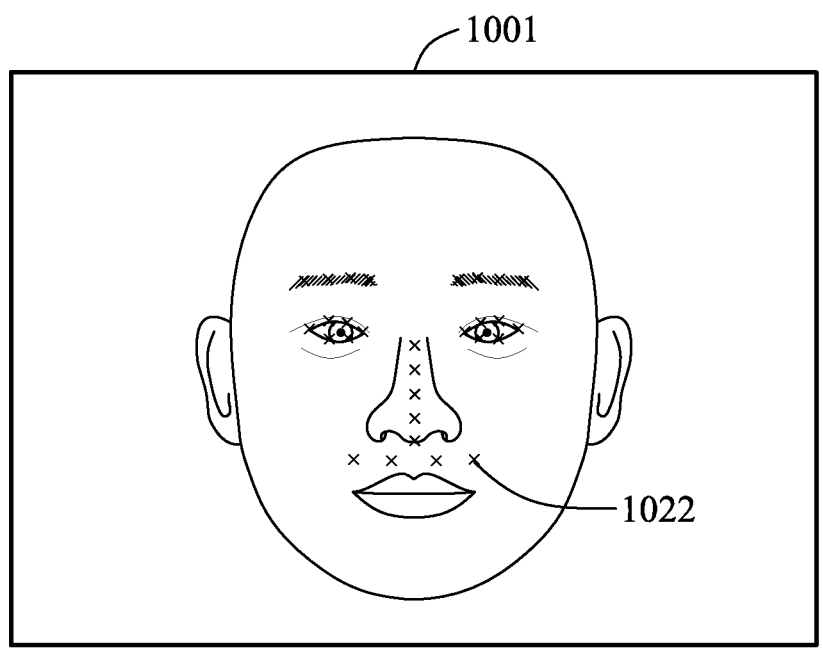
FIG. 10 illustrates another tracked second candidate landmark according to at least one example embodiment.
Figure 11:
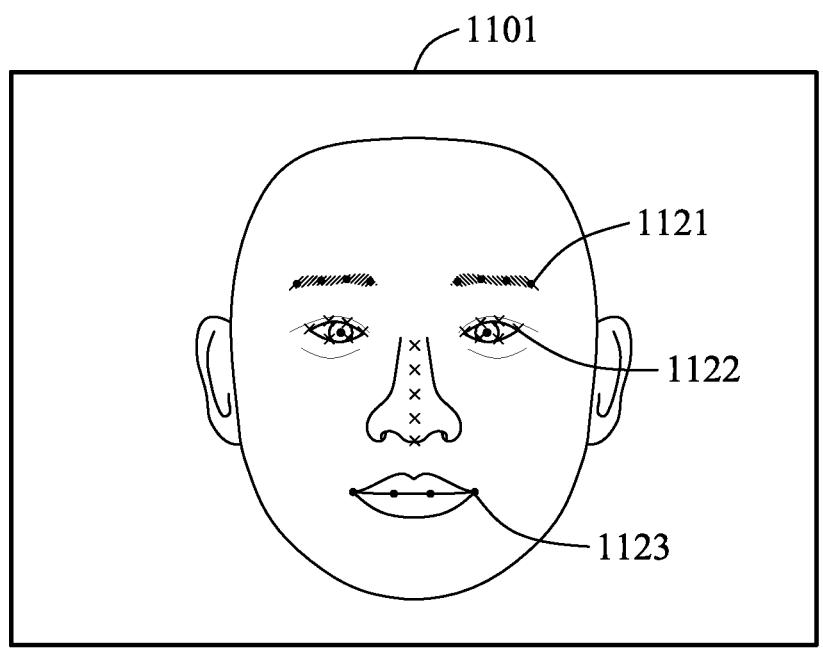
FIG. 11 illustrates a final landmark according to at least one example embodiment.

The level of similarity between the local patches may indicate a level of similarity between histograms of the local patches adjacent to two landmarks. In an example, FIG. 9 illustrates a level of similarity between a histogram of a local patch adjacent to a final landmark of a previous frame and a histogram of a local patch adjacent to a second candidate landmark of a current frame. In another example, FIGS. 10 and 11 illustrate a level of similarity between a histogram of a local patch adjacent to a first candidate landmark and a histogram of a local patch adjacent to a key landmark, and a level of similarity between a histogram of a local patch adjacent to a second candidate landmark and a histogram of a local patch adjacent to a key landmark.

In operation 250, a landmark corrector determines final landmark information of the current frame based on the first candidate landmark and the second candidate landmark. The final landmark information may indicate information associated with a final landmark and include a position, a pixel, brightness, and a histogram of the final landmark.

In addition, a key landmark determiner may determine a key landmark of the current frame based on a result of comparing the first candidate landmark to the second candidate landmark, and provide the determined key landmark to the landmark corrector.

The key landmark may be a highly reliable landmark to be provided as a reference for a subsequent frame, for example, all frames subsequent to the current frame. When the first candidate landmark and the second candidate landmark are identical or similar, the first candidate landmark and the second candidate landmark may be determined to be the key landmark. For example, when a distance between the first candidate landmark and the second candidate landmark is less than a predetermined and/or selected key threshold, one of the first candidate landmark and the second candidate landmark, or a landmark associated with the first candidate landmark and the second candidate landmark, for example, a mean between the first candidate landmark and the second candidate landmark, may be determined to be the highly reliable landmark. The key threshold may indicate a threshold distance between two landmarks preset to determine whether the two landmarks are identical or similar.

In addition, the key landmark may be updated for every frame or at regular intervals by comparing the first candidate landmark to the second candidate landmark. A detailed method of determining the final landmark using the key landmark will be described with reference to FIGS. 3 and 11.

In the example of FIG. 2, the method of determining a landmark of an image using a key landmark may be repeated for each frame. For example, for each frame, a landmark determining device using a key landmark may detect a first candidate landmark from an ROI in operation 220, track a second candidate landmark in operation 230, and determine a final landmark in operation 250.

The landmark determining device using a key landmark may detect the first candidate landmark using statistical feature information, and track the second candidate landmark using feature information of a local image. The landmark determining device using a key landmark may determine a highly reliable landmark using heterogeneous sets of feature information, for example, the statistical feature information and the feature information of a local patch.

FIG. 3 is a flowchart illustrating a method of determining a landmark of an image according to at least one example embodiment.

Referring to FIG. 3, in operation 310, an ROI detector detects an ROI of a current frame. The ROI detector may detect the ROI through an operation similar to operation 210 described with reference to FIG. 2. However, when the ROI is not detected in operation 310, an ROI predicted in operation 360 for a previous frame may be provided to a landmark detector.

For example, the ROI detector may detect a face region, for example, a rectangular region, from an input image using a Viola-Jones face detector.

In operation 320, the landmark detector detects a first candidate landmark of the current frame from the ROI. For example, the landmark detector may detect the first candidate landmark corresponding to a main feature of a face, for example, an eyebrow, an eye, a nose, a lip, and a chin, and align the detected first candidate landmark in accordance with the face region. As described with reference to FIG. 2, the landmark detector may use an AAM, an ASM, and an SDM as a method of detecting a landmark corresponding to a face in an input image by learning face information of individuals in advance and using mean shape information.

In operation 330, a landmark tracker tracks a second candidate landmark of the current frame from the previous frame. The landmark tracker may track the second candidate landmark in the current frame by tracking an individual landmark detected from the previous frame. For example, the landmark tracker may use an optical flow method that is suggested by Bruce D. Lucas and Takeo Kanade and compares sets of neighboring pixel brightness information, the entire contents of which are herein incorporated by reference.

In operation 331, the landmark tracker verifies whether the tracking is successful. For example, the landmark tracker may calculate a level of similarity between a local patch of a final landmark of the previous frame and a local patch of the second candidate landmark. When a point at which the calculated level of the similarity is less than a threshold value is present, the landmark tracker may determine the tracking to be a failure.

For example, when the landmark tracker performs a bidirectional optical flow and two results do not correspond to each other, the landmark tracker may perform template matching on the local patch of the final landmark found in the previous frame and correct the second candidate landmark. When the point at which the level of the similarity is less than the threshold value is still present despite the template matching, the landmark tracker may determine the tracking to be a failure. A detailed operation of verifying the tracking through the bidirectional optical flow will be described with reference to FIG. 9.

In operation 340, a key landmark determiner determines a key landmark of the current frame based on the first candidate landmark and the second candidate landmark. The key landmark determiner may determine whether the current frame is a highly reliable frame based on the detected first candidate landmark and the tracked second candidate landmark to use the highly reliable frame as a reference for landmark correction in operation 350. The highly reliable frame may indicate a key frame to be a reference for determination of a final landmark. Information associated with the key frame may include, for example, a position of the key landmark in an input image and a histogram of a local patch adjacent to the key landmark. The histogram may correspond to an intensity distribution.

For example, when a difference between a position of the first candidate landmark and a position of the second candidate landmark is less than a predetermined and/or selected key threshold, the key landmark determiner may determine one of the first candidate landmark and the second candidate landmark to be the key landmark. The key threshold may indicate a threshold distance between two landmarks preset to determine whether the two landmarks are identical or similar.

In operation 341, a key landmark storage stores the key landmark. The key landmark storage may store the key landmark determined in operation 340 for a subsequent frame. When the current frame is an n-th frame, wherein "n" denotes an integer greater than or equal to 1, the subsequent frame may include all frames subsequent to the n-th frame. In addition, each time the key landmark is determined in operation 340, the key landmark storage may update and store the key frame and the key landmark for the subsequent frame. Information associated with the key frame and the key landmark to be stored in the key landmark storage may include the key frame of the input image, a position of the key landmark, and a histogram of a local patch of the key landmark.

In conventional technology, when a change in a facial pose or a facial expression is great in comparison to a mean face or a mean shape, a high accuracy may not be ensured by only detecting a landmark. According to an example embodiment, a landmark determining device may determine the accuracy by comparing, to the key landmark, the detected first candidate landmark and the second candidate landmark tracked from the previous frame.

In operation 350, a landmark corrector determines final landmark information of the current frame based on the first candidate landmark, the second candidate landmark, and the key landmark. The final landmark information may include a position of a final landmark and a histogram of a local patch.

When the key landmark determiner determines the key landmark of the current frame, the landmark corrector may determine information associated with the key landmark to be the final landmark information. The key landmark may be the highly reliable landmark because the difference between the position of the first candidate landmark and the position of the second candidate landmark is less than the predetermined and/or selected key threshold.

When the key landmark of the current frame is absent, the landmark corrector may compare the first candidate landmark and the second candidate landmark to the key landmark and determine a landmark with a higher accuracy to be the final landmark. For example, the landmark corrector may determine the final landmark as illustrated in Table 1.

TABLE 1

| Case | Detecting | Tracking | Final landmark |
|---|---|---|---|
| Case 1 | ○ | X | Detected first candidate landmark (for example, a first frame) |
| Case 2 | X | ○ | Tracked second candidate landmark |
| Case 3 | X | X | Failure in landmark determination |
| Case 4 | ○ | ○ | Determine a landmark with a high level of similarity to be a final landmark by comparing, to a key landmark, a first candidate landmark and a second candidate landmark |

For example, when the tracking of the second candidate landmark fails, as in Case 1, the landmark corrector may determine information associated with the first candidate landmark to be the final landmark information. When the first candidate landmark is not detected, as in Case 2, the landmark corrector may determine information associated with the second candidate landmark to be the final landmark information. When both the detecting of the first candidate landmark and the tracking of the second candidate landmark fails, as in Case 3, the final landmark information of the current frame may not be determined.

When both the first candidate landmark and the second candidate landmark with respect to the current frame are present, as in Case 4, the landmark corrector may determine the final landmark information based on a result of comparing at least one of the first candidate landmark and the second candidate landmark to the key landmark stored prior to the current frame, for example, an immediately previous frame or a most recent key landmark prior to the current frame. For example, the landmark corrector may determine the final landmark information based on a result of calculating a level of similarity between the first candidate landmark and the prestored key landmark and a level of similarity between the second candidate landmark and the prestored key landmark.

The level of similarity may indicate a level of similarity between histograms of local patches adjacent to two landmarks. For example, the landmark corrector may obtain the level of similarity by calculating histograms of local patches of the first candidate landmark and the second candidate landmark and comparing the histograms to a histogram of a local patch of the key landmark.

In addition, based on at least one first component including the first candidate landmark and at least one second component including the second candidate landmark, the landmark corrector may determine the final landmark information including at least one of the at least one first component and the at least second component.

The landmark corrector may compare the at least one first component and the at least one second component to a corresponding reference component among at least one reference component, for example, a component of the key landmark, including the prestored key landmark prior to the current frame, and determine a component with a high level of similarity to be included in the final landmark information. The level of similarity between the components may be indicated as a sum of similarities between the landmarks included in the components. A detailed operation of determining the final landmark information based on a component will be described with reference to FIG. 11.

The final landmark information determined with respect to the current frame in operation 350 may be used to track a second candidate landmark of a subsequent frame in operation 330.

In operation 360, an ROI predictor predicts an ROI of the subsequent frame. The ROI predictor may estimate the ROI of the subsequent frame using the final landmark information determined in operation 350. For example, the ROI predictor may predict, as the ROI, a region including the second candidate landmark of the subsequent frame tracked from the final landmark information of the current frame. For example, when the ROI is a face region, the ROI may be detected as a rectangular region including the second candidate landmark of the subsequent frame.

For example, when the ROI is not detected in operation 310, the ROI predicted with respect to the current frame based on the final landmark of the previous frame may be used to detect the first candidate landmark of the current frame. In addition, when the ROI of the current frame is not detected, the ROI predictor may predict the ROI based on the final landmark information determined in the previous frame.

Figure 4:
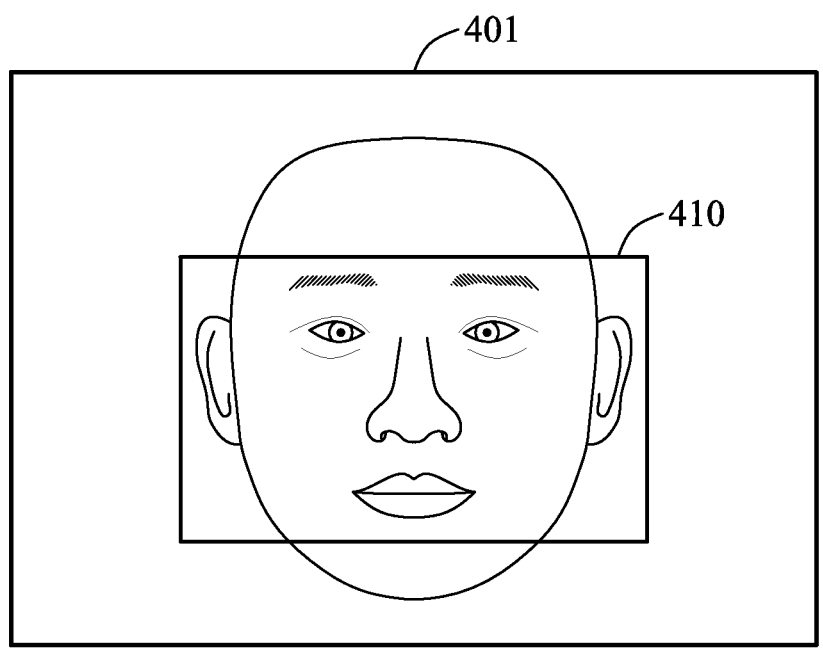
FIG. 4 illustrates a detected ROI according to at least one example embodiment.

FIG. 4 illustrates a detected ROI according to at least one example embodiment.

Referring to FIG. 4, the ROI detector in operation 310 described with reference to FIG. 3 may detect an ROI 410 from an input image 401. For example, the input image 401 may include a human being and the ROI 410 may include a landmark representing a feature of a human face.

Figure 5:
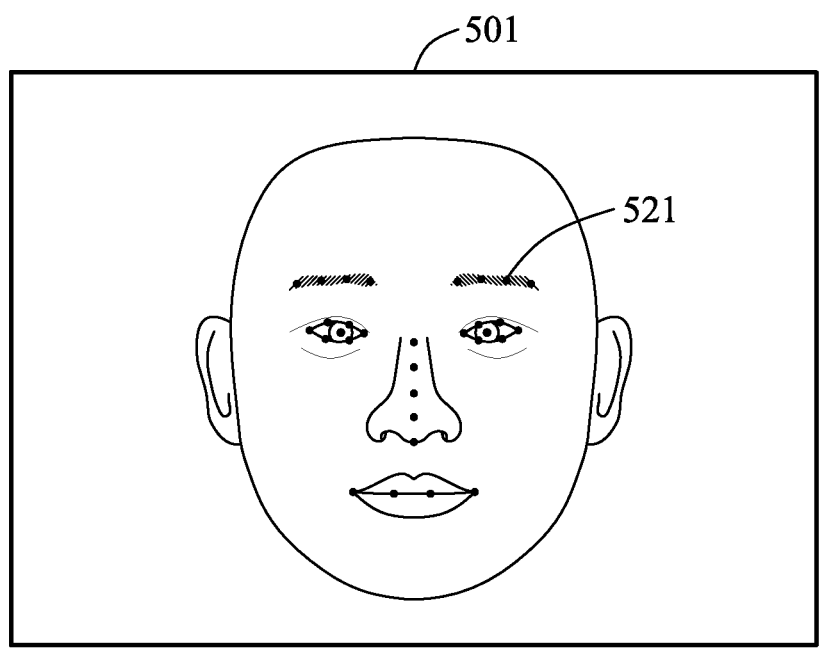
FIG. 5 illustrates a detected first candidate landmark according to at least one example embodiment.

FIG. 5 illustrates an example of a detected first candidate landmark according to at least one example embodiment.

Referring to FIG. 5, the landmark detector in operation 320 described with reference to FIG. 3 may detect a first candidate landmark 521 from the ROI 410 of FIG. 4 in an input image 501. In the example of FIG. 5, a limited number of the first candidate landmark 521 is illustrated. However, the number of the first candidate landmark 521 is not limited thereto and the number of the first candidate landmark 521 may vary. Also, in the example of FIG. 5, the first candidate landmark 521 is illustrated to be detected from eyebrows, eyes, a nose, and lips of a human face. However, the first candidate landmark 521 may be set for another feature point indicating a different feature of the human face.

Figure 6:
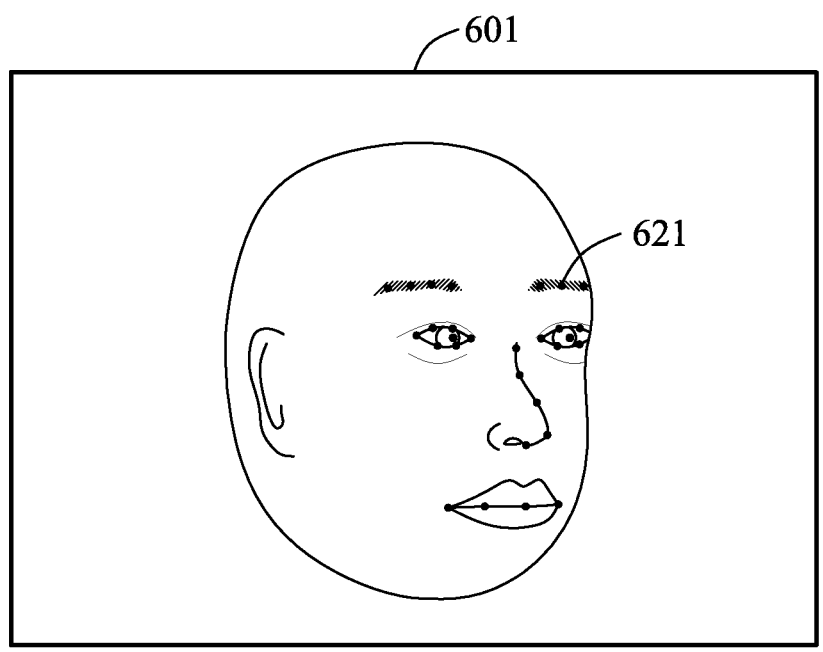
FIG. 6 illustrates a final landmark determined in a previous frame according to at least one example embodiment.
Figure 7:
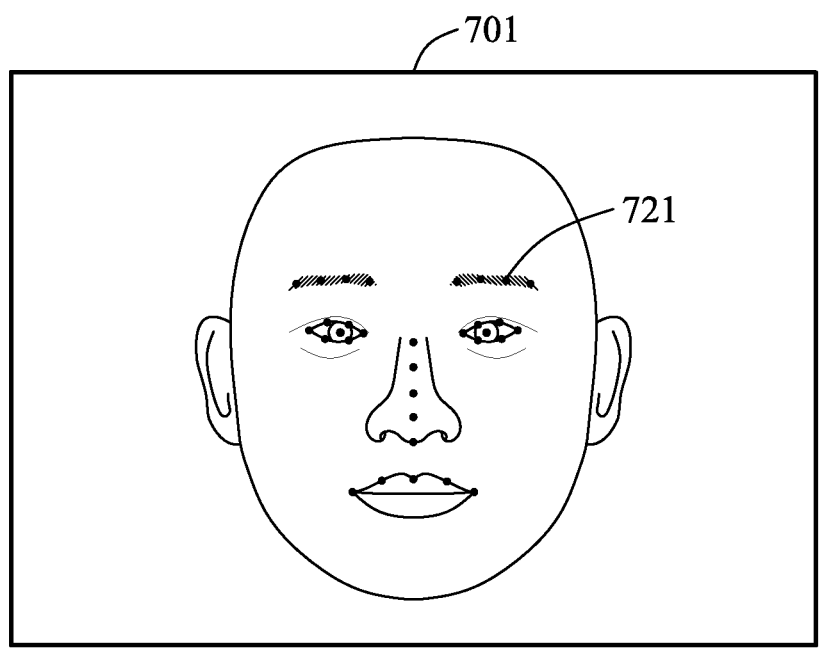
FIGS. 7 and 8 illustrate examples of a second candidate landmark tracked from the determined final landmark of FIG. 6.
Figure 8:
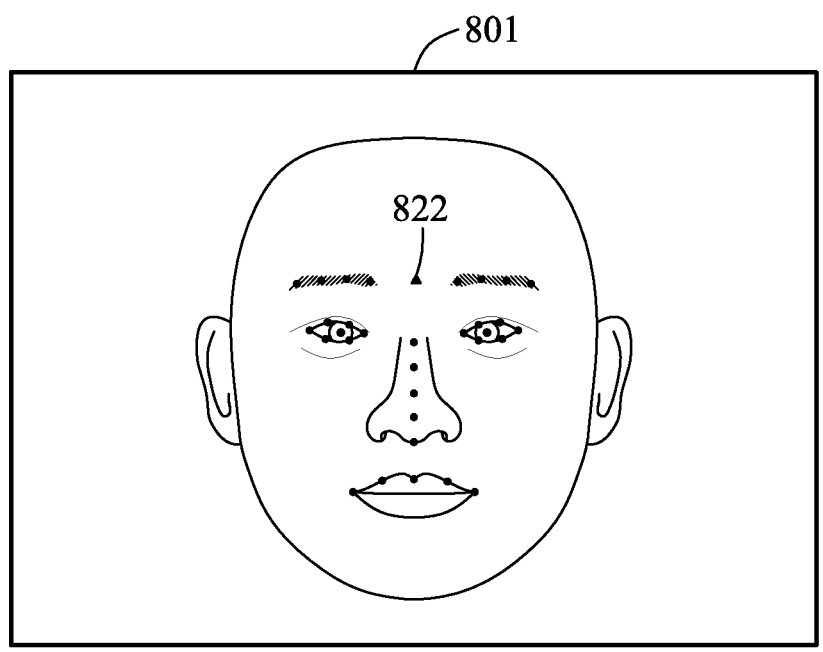

FIG. 6 illustrates a final landmark determined in a previous frame according to at least one example embodiment. FIGS. 7 and 8 illustrate examples of a second candidate landmark tracked from the determined final landmark of FIG. 6 according to at least one example embodiment.

The landmark tracker in operation 330 described with reference to FIG. 3 may track a second candidate landmark of an input image 701 of a current frame of FIG. 7 and of an input image 801 of the current frame of FIG. 8 from an input image 601 of a previous frame of FIG. 6. FIG. 7 illustrates a second candidate landmark 721 normally tracked for the input image 701 of the current frame, and FIG. 8 illustrates a second candidate landmark 822 erroneously tracked for the input image 801 of the current frame.

Hereinafter, the current frame may be indicated as an n-th frame, wherein "n" denotes an integer greater than or equal to 1, the previous frame may be indicated as an n−1th frame, and a subsequent frame may be indicated as an n+1th frame.

FIGS. 7 and 8 illustrate a human face obtained by slightly rotating the human face illustrated in FIG. 6 to a right direction. Here, the example illustrated in FIG. 6 may indicate the input image 601 of the previous frame, for example, the n-1th frame, and the examples illustrated in FIGS. 7 and 8 may indicate the input image 701 and the input image 801, respectively, of the current frame, for example, the n-th frame.

Also, FIG. 6 illustrates a final landmark 621 determined in the previous frame. FIGS. 7 and 8 illustrate the second candidate landmarks 721 and 822, respectively, tracked from the final landmark 621 of FIG. 6 by a landmark tracker.

A second candidate landmark tracked by the landmark tracker may be erroneously tracked, and an example of the second candidate landmark erroneously tracked is illustrated as the second candidate landmark 822 indicated as a triangle between eyebrows of the human face of FIG. 8.

FIG. 9 illustrates an operation of verifying whether tracking a second candidate landmark is successful according to at least one example embodiment.

Referring back to FIG. 3, the landmark tracker verifies whether tracking the second candidate landmark is successful in operation 331. Referring to FIG. 9, an input image 901 of an n-1th frame is illustrated in a left side, and an input image 902 of an n-th frame is illustrated in a right side. FIG. 9 also illustrates a position "Pn-1(i)" 931 of an i-th final landmark of the n-1th frame, a position "Pn(i)" 941 of a point obtained by tracking the Pn-1(i) 931 in the n-th frame, and a position "Pn-1(i)'" 932 of a point obtained through reverse tracking of the Pn(i) 941 of the n-th frame in the n-1th frame. In the example of FIG. 9, a solid line indicates that the tracking is successful with a difference between the Pn-1(i) 931 and the Pn-1(i)' 932 being less than or equal to a predetermined and/or selected range, and a broken line indicates that the tracking is unsuccessful with the difference between the Pn-1(i) 931 and the Pn-1(i)' 932 being greater than the predetermined and/or selected range. However, verification of the tracking may not be limited to the description in the foregoing. When a level of similarity between local patches including the Pn-1(i) 931 and the Pn-1(i)' 932 is greater than a local threshold, the tracking may be verified to be successful. Conversely, when the level of similarity is less than or equal to the local threshold, the tracking may be verified to be a failure.

For example, when the number of points, for example, second landmarks, obtained through the failed tracking is greater than or equal to a predetermined and/or selected number, the landmark tracker may determine the tracking in a corresponding frame to be a failure.

FIG. 10 illustrates another example of a tracked second candidate landmark according to at least one example embodiment.

Referring back to FIG. 3, the key landmark determiner may determine a key landmark of a current frame based on a first candidate landmark and a second candidate landmark in operation 360. The input image 501 of FIG. 5, the input image 701 of FIG. 7, and an input image 1001 of FIG. 10 may indicate an image of the current frame.

For example, the first candidate landmark may be detected as the first candidate landmark 521 illustrated in FIG. 5, and the second candidate landmark may be tracked as the second candidate landmark 721 illustrated in FIG. 7. When a difference between a position of the first candidate landmark 521 and a position of the second candidate landmark 721 is less than a predetermined and/or selected key threshold, for example, when the first candidate landmark 521 and the second candidate landmark 721 are identical or similar, the key landmark determiner may determine the current frame to be a key frame, and a landmark of the key frame to be the key landmark.

For another example, when the first candidate landmark is detected as the first candidate landmark 521 and the second candidate landmark is tracked as a second candidate landmark 1022 illustrated in FIG. 10, a landmark corrector may determine, to be a final landmark, a landmark having a higher level of similarity with the key landmark of the first candidate landmark 521 and the second candidate landmark 1022. For example, the tracked second candidate landmark 1022 corresponding to lips in FIG. 10 may be different from the first candidate landmark 521 corresponding to lips in FIG. 5.

FIG. 11 illustrates a final landmark according to at least one example embodiment.

Referring back to FIG. 3, in operation 350, when a current frame is not a key frame, the landmark corrector determines final landmarks, for example, a final landmark 1121, a final landmark 1122, and a final landmark 1123, by comparing a first candidate landmark and a second candidate landmark to a key landmark. For example, the landmark corrector may calculate, in a unit of a component, a level of similarity between the first candidate landmark 521 of FIG. 5 and the key landmark and a level of similarity between the second candidate landmark 1022 of FIG. 10 and the key landmark.

For example, the first candidate landmark detected with respect to the current frame may be the first candidate landmark 521, and the second candidate landmark tracked for the current frame may be the second candidate landmark 1022. Here, for landmarks corresponding to a nose and eyes, the level of similarity between the second candidate landmark 1022 and the key landmark may be higher than the level of similarity between the first candidate landmark 521 and the key landmark.

For example, in an input image 1101 of FIG. 11, the landmark corrector may determine that the landmark 1121 corresponding to eyebrows and the landmark 1123 corresponding to lips among at least one first component including the first candidate landmark are included in final landmark information, based on a level of similarity based on each component. In addition, the landmark corrector may determine that the landmark 1122 corresponding to eyes among at least one second component including the second candidate landmark is included in the final landmark information. Here, each of the first component and each of the second component may be compared to a corresponding reference component in the key frame to calculate the level of similarity based on each component.

The final landmarks 1121, 1122, and 1123 may be determined for which heterogeneous sets of feature information, for example, statistical feature information and feature information of a local patch, are simultaneously considered and thus, highly reliable.

Figure 12:
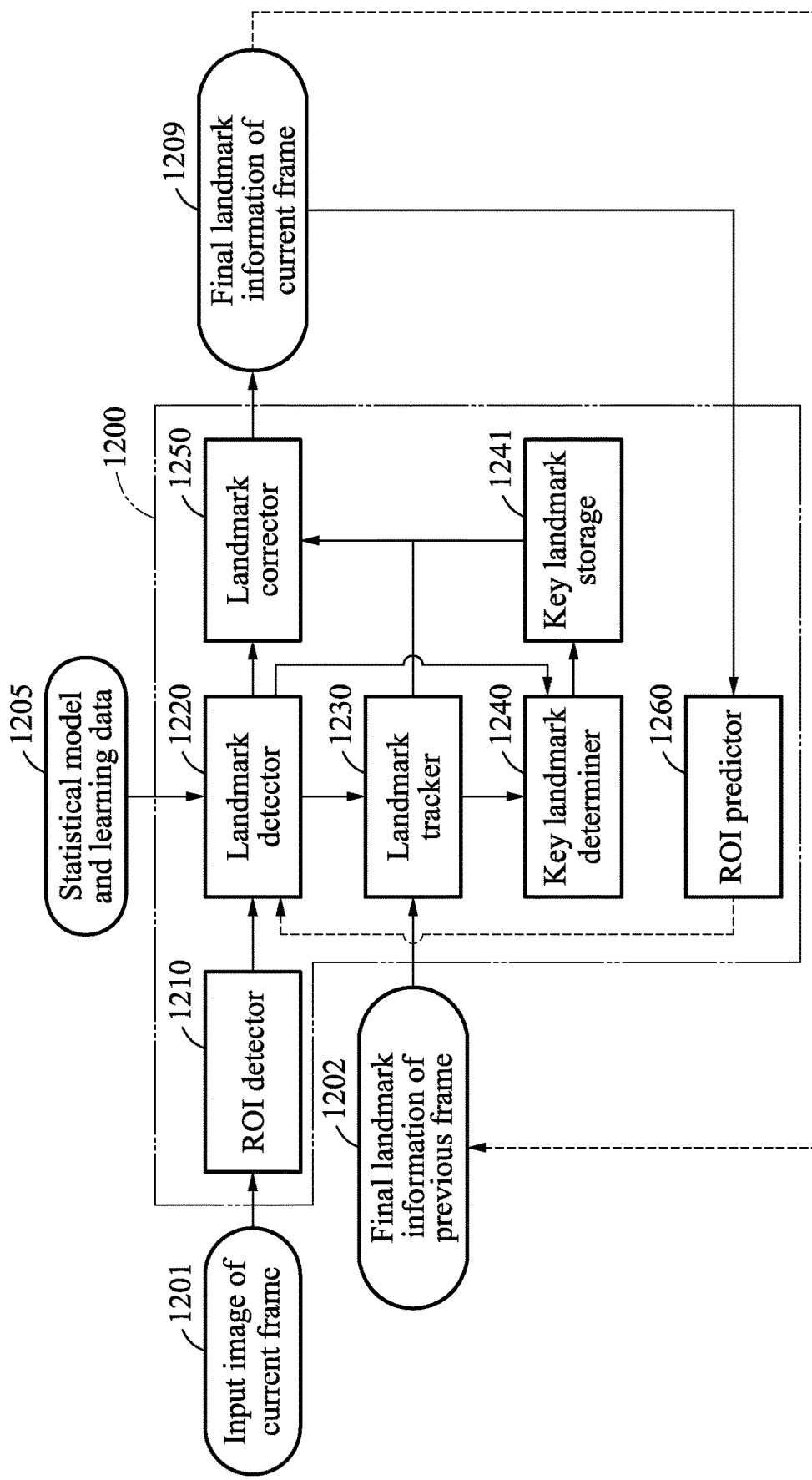
FIG. 12 is a diagram illustrating an example of a device for determining a landmark of an image according to at least one example embodiment.

FIG. 12 is a diagram illustrating a landmark determining device 1200 according to at least one example embodiment. The landmark determining device 1200 is configured to perform the methods and functions described with respect to FIGS. 1-11.

Referring to FIG. 12, the landmark determining device 1200 includes an ROI detector 1210, a landmark detector 1220, a landmark tracker 1230, a key landmark determiner 1240, a key landmark storage 1241, a landmark corrector 1250, and an ROI predictor 1260. In FIG. 12, a solid line may indicate an operation to be performed in a current frame, and a broken line may indicate an operation to be performed in a subsequent frame.

The ROI detector 1210 may receive an input image 1201 of the current frame and detect and an ROI from the input image 1201. The landmark detector 1220 may detect a first candidate landmark from the ROI using a statistical model and learning data 1205. The landmark tracker 1230 may track a second candidate landmark of the current frame from final landmark information 1202 of a previous frame. The key landmark determiner 1240 may determine a key landmark based on the first candidate landmark detected by the landmark detector 1220 and the second candidate landmark tracked by the landmark tracker 1230. When the key landmark determiner 1240 determines the key landmark of the current frame, the key landmark storage 1241 may store information associated with the key landmark with the current frame being a key frame.

The landmark corrector 1250 may determine final landmark information 1209 of the current frame based on at least one of the first candidate landmark, the second candidate landmark, and the key landmark. The determined final landmark information 1209 may be used for the ROI predictor 1260 to predict an ROI for a subsequent frame. In addition, the final landmark information 1209 of the current frame may be used for the landmark tracker 1230 to track a second candidate landmark of the subsequent frame.

For a detailed operation of the landmark determining device 1200, reference may be made to the description provided with reference to FIG. 3.

The units and/or modules (e.g., the ROI detector 1210, the landmark detector 1220, the landmark tracker 1230, the key landmark determiner 1240, the landmark corrector 1250 and the ROI predictor 1260) described herein may be implemented using hardware components and hardware components executing software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A device for determining a landmark of an image, the device comprising:
at least one processor configured to execute computer-readable instructions to,
detect a first candidate landmark from a region of interest (ROI) of a current frame of an input image;
track a second candidate landmark of the current frame from final landmark information of a previous frame of the input image;
determine a key landmark based on the first candidate landmark and the second candidate landmark; and
determine final landmark information of the current frame based on a level of similarity between a first histogram of a first local patch adjacent to the detected first candidate landmark and a second histogram of a second local patch adjacent to the key landmark and a level of similarity between a third histogram of a third local patch adjacent to the tracked second candidate landmark and the second histogram of the second local patch adjacent to the key landmark.

2. The device of claim 1, wherein the at least one processor is configured to execute computer-readable instructions to determine the final landmark information of the current frame based on at least one of a first component including the first candidate landmark and a second component including the second candidate landmark.

3. The device of claim 2, wherein the at least one processor is configured to execute computer-readable instructions to determine the final landmark information of the current frame based on the first component, the second component and a corresponding reference component.

4. The device of claim 1, wherein the at least one processor is configured to execute computer-readable instructions to predict the ROI of the current frame from the final landmark information of the previous frame.

5. The device of claim 1, wherein
the at least one processor is configured to execute computer-readable instructions to verify whether the tracking of the second candidate landmark is successful.

6. The device of claim 1, the at least one processor is configured to execute computer-readable instructions to detect the ROI of the current frame.

7. A method of determining a landmark of an image, the method comprising:
detecting a first candidate landmark from a region of interest (ROI) of a current frame of an input image;
tracking a second candidate landmark of the current frame from final landmark information of a previous frame of the input image;
determining a key landmark based the first candidate landmark and the second candidate landmark; and
determining final landmark information of the current frame based on a level of similarity between a first histogram of a first local patch adjacent to the first candidate landmark and a second histogram of a second local patch adjacent to the key landmark and a level of similarity between a third histogram of a third local patch adjacent to the second candidate landmark and the second histogram of the second local patch adjacent to the key landmark.

8. The method of claim 7, wherein the determining of the final landmark information of the current frame comprises:
determining the final landmark information of the current frame based on at least one of a first component including the first candidate landmark and a second component including the second candidate landmark.

9. The method of claim 8, wherein the determining of the final landmark information of the current frame further comprises:
determining the final landmark information of the current frame based on the first component, the second component and a corresponding reference component.

10. The method of claim 7, wherein the detecting of the first candidate landmark comprises:
predicting the ROI of the current frame from the final landmark information of the previous frame.

11. The method of claim 7, wherein
the tracking of the second candidate landmark includes, verifying whether the tracking is successful.

12. The method of claim 7, further comprising:
detecting the ROI of the current frame.

13. The device of claim 1, wherein the current frame includes a face of a user.

14. The method of claim 7, wherein the current frame includes a face of a user.

* * * * *